May 13, 1924.
L. V. PLUYM
HOSE SUPPORT
Filed June 20, 1921
1,493,498
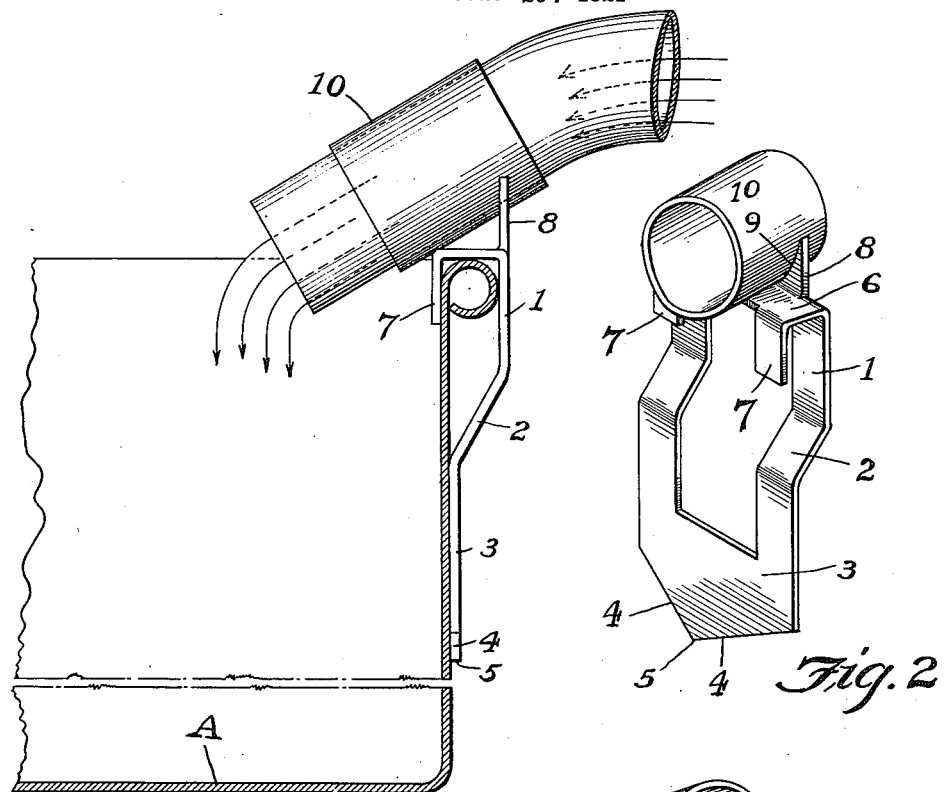
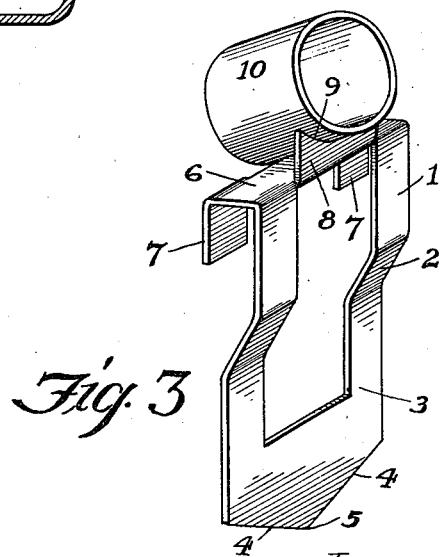
Inventor:
Louis V. Pluym.
By Fred'k J. Larson
Attorney.

Patented May 13, 1924.

1,493,498

UNITED STATES PATENT OFFICE.

LOUIS V. PLUYM, OF ST. LOUIS, MISSOURI.

HOSE SUPPORT.

Application filed June 20, 1921. Serial No. 478,848.

*To all whom it may concern:*

Be it known that I, LOUIS V. PLUYM, a citizen of the United States, residing in the city of St. Louis and State of Missouri, have invented certain new and useful Improvements in Hose Supports, of which the following is a specification.

My invention relates to hose supports, and, more particularly to a support for supporting or holding a rubber garden hose in a fixed position with relation to a receptacle, such for instance as a wash tub while filling the same with water, thus obviating the necessity of holding the hose with the hand.

A further object of the invention is to provide a hose support, which may be forced into the soil to support a garden hose while sprinkling lawns, gardens or filling holes.

With the above and other objects in view, the invention consists in the novel features of construction, arrangement and combination of parts hereinafter more fully described and finally pointed out in the claims hereto appended.

Referring to the accompanying drawings forming a part of this specification wherein like characters of reference denote similar parts throughout the several views:

Fig. 1, is a side elevation of my improved hose support applied to a tub.

Fig. 2, is a perspective view of a hose support formed in accordance with my invention.

Fig. 3, is a perspective view of the hose support looking from the opposite direction of Fig. 2.

Referring to the drawings, the reference character A indicates a portion of a suitable receptacle, such for instance as a wash tub.

In carrying out the aim of my present invention, I employ a metallic plate 1 having the offset portion 2 terminating below in an embracing section 3, the lower end of which is beveled, as at 4, to provide the pointed end 5 so that it may be easily inserted or forced into the earth, or soil when desired.

The upper end of the plate 1 is bent at a right angle to the plate to form a supporting flange 6 and each free corner of the flange 6 terminates in a suitable lip 7 lying parallel with the plate, but spaced therefrom to form retaining hooks for hooking over the upper edge of a tub to support the hose support in position thereon, as shown in Fig. 1.

The flange 6 has its edge opposite the hook lips 7 provided with an upwardly directed supporting lip 8 having the concaved upper edge 9 for the reception of the forward end of a hose receiving sleeve 10 which rests at its rear end upon the flange 6 thereby disposing the sleeve at an angle in suitable fixed relation with the supporting plate.

It will be observed that by disposing the sleeve 10 at an angle that by directing a hose thereinto from its upper open end, that the hose will direct the flow of water therethrough directly into the tub without having to stand and hold the hose while filling the tub.

When the supporting plate is forced into the earth and the hose 11 directed into the sleeve from the lower open end thereof, it will be observed that the flow of water can be directed upwardly at any angle desired when sprinkling lawns, gardens, etc., without the necessity of holding the hose in the hands.

It is evident that when the hose support is applied to a tub by hooking the same over the edge of the tub, that the lips 7 embrace the inner face of the tub while the lower section 3 embraces the outer face of the tub at a suitable point below the embracing lips 7 thereby securely retaining the hose support in its hooked position upon the rim of the tub.

It is evident from the foregoing description, that I provide a hose support which is simple and comparatively inexpensive in construction, quickly applied to the rim of a tub or inserted into the earth, and one which will effectively hold a hose in a position to direct the water downwardly into a tub or other receptacle, or upwardly at any desired angle when inserted or forced into the earth, as is manifest.

The many advantages of the herein described invention will readily suggest themselves to those skilled in the art to which it appertains.

I do not desire to be understood as limiting myself to the exact details of construction and arrangement as herein described and illustrated, as it is manifest that variations and modifications may be made without departing from the spirit and scope of my invention and the terms of the following claims, hence I wish it to be understood that I reserve the right to make any such changes, or modifications as may fairly fall within the scope of the appended claims when fairly construed.

What I claim is:

1. In a garden hose supporting structure, a flat metallic plate having its upper end directed rearwardly at a right angle thereto and terminating at each corner in a downwardly directed lip to provide a pair of tub embracing hooks, said plate having an offset section intermediate its ends to position the lower end of the plate to the rear of the upper section so as to embrace the wall of a tub for holding the device in position when applied to a tub, a lip integral with the upper section of the plate and having a concaved upper edge lying above the plane of the rearwardly directed upper end of the upper section and a tubular hose holding sleeve fixed to the concaved upwardly directed lip and the rearwardly directed upper section of the plate.

2. A hose support comprising a flat plate having an intermediate offset section to provide a lower pointed tub wall embracing section and an upper section out of alignment with the lower section, the upper end of said upper section being directed rearwardly and then the corners thereof directed downwardly to lie in spaced parallel relation with the upper section of the plate to provide a hook for attachment to the upper edge of a tub, a lip directed upwardly from the rearwardly directed portion of the upper section and a hose receiving sleeve supported in an inclined position upon the rearwardly directed portion of the upper section of the plate and said upwardly directed sleeve.

In testimony whereof, I have hereunto signed my name to the specification.

LOUIS V. PLUYM.